March 30, 1937.     M. DACH     2,075,272
AIR INLET FOR INTERNAL COMBUSTION ENGINES
Filed April 21, 1934     2 Sheets-Sheet 1
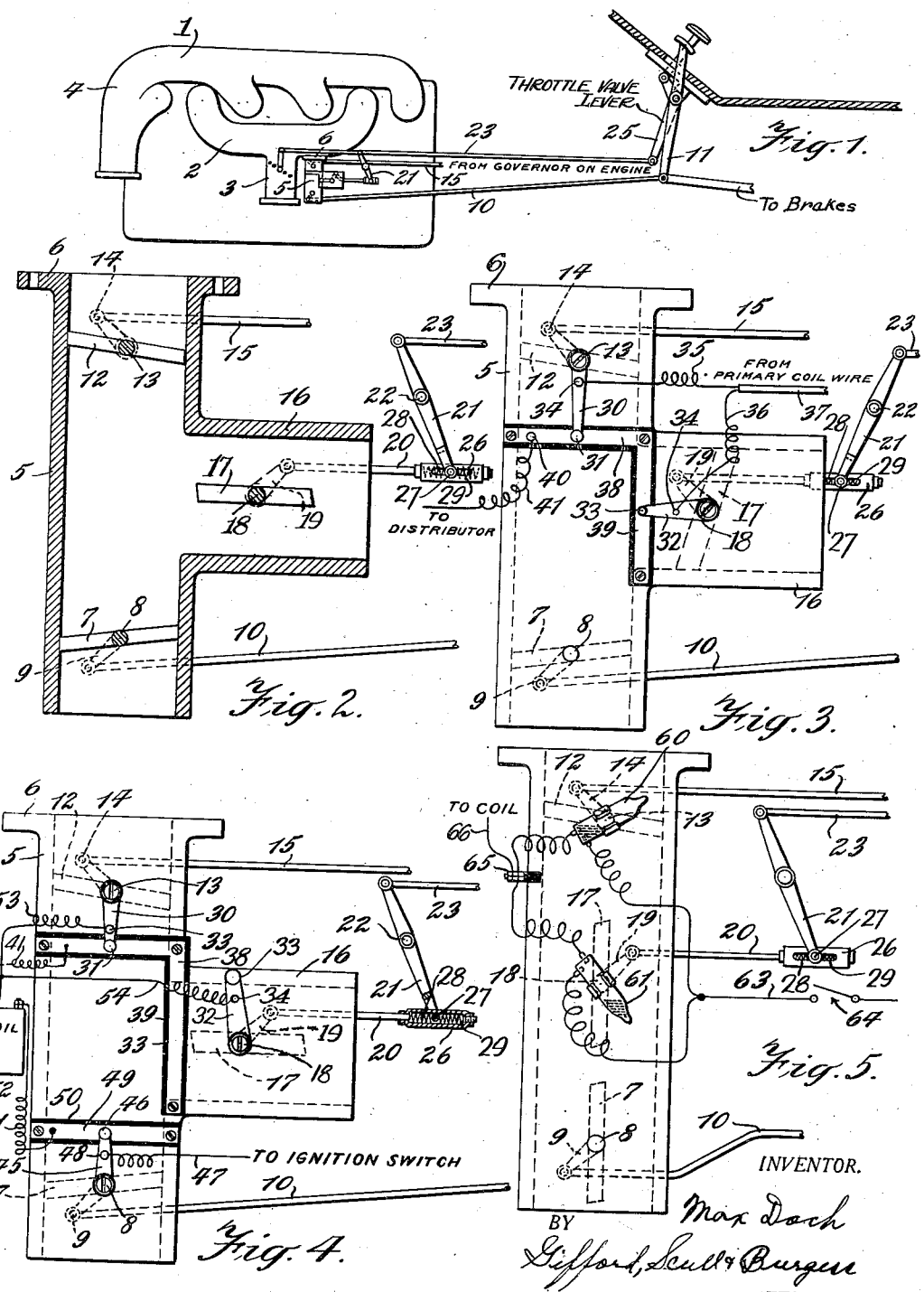

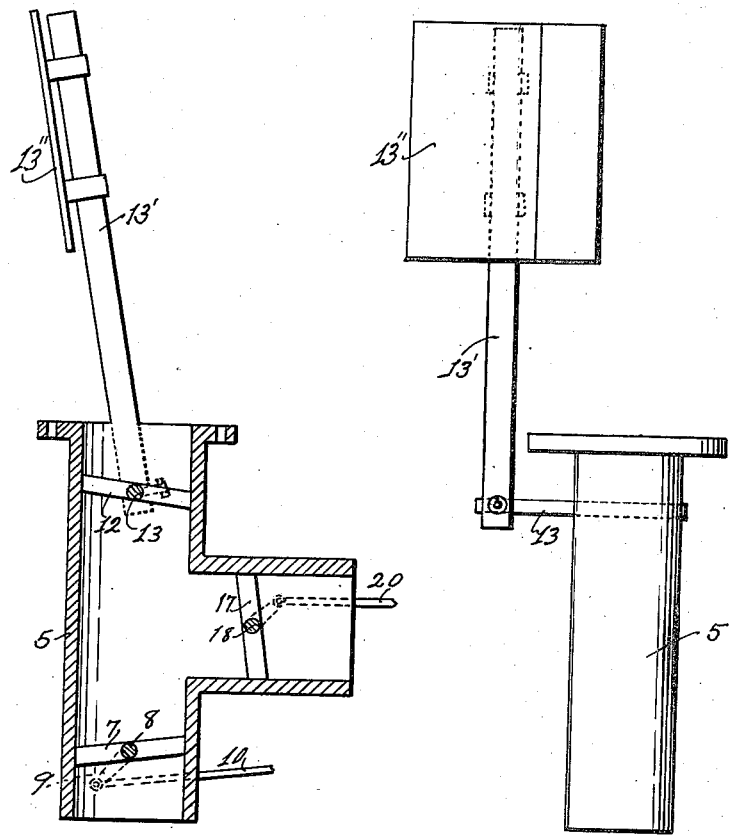

Patented Mar. 30, 1937

2,075,272

UNITED STATES PATENT OFFICE 2,075,272

AIR INLET FOR INTERNAL COMBUSTION ENGINES

Max Dach, Flushing, N. Y.

Application April 21, 1934, Serial No. 721,708

12 Claims. (Cl. 192—3)

This invention relates to an internal combustion engine and is particularly useful when such engines are used for driving motor vehicles.

By this invention the danger of black or unconsumed exhaust gases escaping from the engine when the vehicle is to be decelerated is greatly decreased, or entirely evoided automatically, without necessitating any conscious effort on the part of the driver for that purpose, a considerable economy in the consumption of gasolene and oil is effected, the dilution of crank-case oil with gasolene is decreased, and when the gasolene has been shut off from said engines they can be permitted to run for a considerable period of time without acting as a brake to a great extent.

In carrying out this invention a tubular two-way air inlet is provided for the inlet or suction manifold of the engine and three valves are provided in this inlet, two of these valves being in parallel and in series with the other one. In a modification the three valves may be in series. One of the valves is located in the inlet nearer the suction manifold than the others and is controlled by the speed of the engine so as to open when the engine speed becomes sufficiently high. Adjustments may be provided so that this valve will remain closed so long as the speed of the engine is below a predetermined minimum.

Another valve is located in the air inlet and is closed while the engine is idling or is in normal operation at either high or low speed, but provision may, however, be made for opening this valve automatically at high speeds to cause air or steam vapors to enter the intake manifold. This valve will ordinarily be opened by the operator applying the foot-brake.

A third valve is located in a branch of the air inlet and is so connected that it is kept closed while the throttle for admitting gas to the engine is open, or while the operator of an automobile which is driven by the internal combustion engine pushes the gas pedal or steps on the accelerator. This third valve opens when admission of fuel to the engine ceases.

So long as the first valve is closed, air from the atmosphere is prevented from reaching the inlet manifold through the air inlet above mentioned, but air freely enters this manifold when the first-mentioned valve and either one or both of the other valves are open. When air enters the suction manifold the vacuum is broken and the mixture from the regular air inlet and the carburetor is caused to cease flowing into the inlet manifold during the period when the two valves are open. Also, when the gas is shut off at high speeds air is permitted to pass through the air inlet, thus breaking the vacuum and preventing the engine from acting too strongly as a brake.

Means may also be provided by which the ignition is automatically cut out when not needed during the time no mixture of air and gas is entering the inlet manifold.

The invention will be understood from the description in connection with the accompanying drawings in which Fig. 1 is a side view of an internal combustion engine with the device in place; Fig. 2 is a section on an enlarged scale through the device; Fig. 3 is a similar view of a modification; Figs. 4 and 5 are similar views of other modifications; and Figs. 6 and 7 are edge and side views showing a wind operated valve.

In the drawings reference character 1 indicates the block or casing of an internal combustion engine that is provided with an inlet manifold 2 with a connection 3 from a carburetor (not shown), and an outlet manifold 4.

In carrying out this invention a hole or opening is provided in the inlet manifold 2 and a two-way inlet pipe or conduit 5 is attached by its flange 6 to the suction manifold over the opening, or a cylindrical or other shaped two-way inlet is provided from the outside air into the inside of the suction manifold in any other convenient way.

A valve 7, which may be a butter-fly type valve, for example, is installed in the inlet 5 and is attached to a shaft 8 that is journalled in air-tight bearings in opposite sides of the inlet pipe 5 with one or both ends of this shaft projecting short distances outside of the pipe or inlet. An arm 9 is attached to a projecting end of the shaft 8 outside of the inlet 5 and a link or other connection 10 extends from the arm 9 to a foot-brake pedal 11 of the automobile so that the valve 7 is opened when the foot-brake pedal 11 is operated.

Another valve 12, which may be either like the valve 7 or of a different type, is located in the inlet 5 in series with the valve 7. The valve 12 is attached to the shaft 13, which extends through the inlet 5 and is journalled in air-tight bearings in opposite sides of the walls thereof, with one or both ends extending short distances beyond the outside of these walls. An arm 14 is attached to one end of the shaft 13 outside of the inlet 5 and a link or connection 15 extends from this arm to a governor on the engine shaft (not shown). This governor may be any of the well known sorts to which the link 15 or other valve operating mechanism may be connected so as to open this valve in accordance with the speed of the engine. The governor can be adjusted to operate the link 15 or other valve operating mechanism at or beyond any desired predetermined speed to open the valve 12. Such governors are not a part of this invention and therefore not illustrated.

The inlet 5 is provided with an open-ended branch 16 on one side between the valves 7 and 12. A valve 17 is located in the branch 16. This valve may be similar to the valves 7 or 12. The valve 17 is mounted on a shaft 18 that is journalled in air-tight bearings in the walls of the branch 16 with one or more of its ends extending beyond the outer surfaces of these walls. An arm 19 is connected to the shaft 18 and a link or other connection 20 extends from the end of the arm 19 to one end of a lever 21 that is journalled on a fixed pivot 22. The other end of the lever 21 may be connected by a link or other connection 23 to a lever 25 that is operated by the gas pedal or accelerator of an automobile. The end of the link 20 is connected to the end of the lever 21 so that the valve 17 will be closed by a very small movement of the accelerator or gas pedal, but the accelerator or gas pedal can be moved farther after the valve 17 is closed. Various devices may be used for this purpose and this feature will not be described in detail except to say that it may consist of a slotted cylinder 26 through the slot of which a pin 27 on the end of the lever 21 extends. Compression springs 28 and 29 are provided in the cylinder 26 on opposite sides of the pin 27 to permit the required amount of play between these two members 20 and 21 after the valve 17 has been closed.

When the engine starts the valves 7 and 12 are closed and initial movement of the accelerator or gas pedal closes the valve 17. The valve 12 moves when the engine has reached the predetermined speed that is set for opening this valve. If the brake is applied to stop the automobile the valve 7 opens, thus breaking the vacuum in the intake manifold 2. Also, when the gas pedal or accelerator is released the valve 17 opens, thus breaking the vacuum and permitting the engine to run without causing too much braking effect even when the clutch is in.

In the modification shown in Fig. 3 an arm 30 is adjustably attached to the end of the shaft 13 and is insulated therefrom. This arm 30 is provided with a wiping contact 31 at its outer or free end. A similar arm 32 is adjustably attached to the extending end of the shaft 18 and is insulated from this shaft. It is provided with a wiping contact 33 at its outer or free end.

The arms 30 and 32 are provided with binding posts 34 and 34', respectively, that are electrically connected to the arms 30 and 32 respectively. Branches 35 and 36 of a wire 37 from the primary coil are connected to the binding posts 34 and 34'.

An L-shaped bar 38 is secured on the outside of the inlet 5 and is insulated therefrom as indicated at 39 (Fig. 3). This metal bar 38 is located between the arms 30 and 32 in such a position that they are contacted by the contacts 31 and 33 when the valves 12 and 17 are closed. A binding post 40 is connected to the bar 38 and a lead wire 41 leads from this binding post to the distributor (not shown) of the engine. The ignition circuit is broken when both of the valves 12 and 17 are open.

With the device shown in Fig. 3 the valves 7, 12 and 17 operate as already described, but the ignition circuit is opened as soon as both of the valves 12 and 17 open, regardless of the position of the valve 7 so that the ignition is shut off as soon as the gas pedal is released, provided the engine is running above the predetermined speed which opens the valve 12.

In the modification shown in Fig. 4 an extension 45 is provided on the end of the shaft 8 outside of the inlet 5 having a wiping contact 46 at its outer end. A wire 47 from the ignition switch (not shown) is connected by means of the binding post 48 to the extension 45. A metal bar 49 with which the wiping contact 46 contacts until the valve 7 is opened to a certain extent is connected to the inlet 5 and is insulated therefrom, as indicated at 50. A wire 51 leads from the metal bar 49 to the ignition coil 52 from which branch wires 53 and 54 lead to the extensions 30 and 32 respectively.

In the modification shown in Fig. 4 the valves 7, 12 and 17 are operated as already described. In this modification the ignition circuit is opened either when the brake is applied to open the valve 7 or when the valves 12 and 17 are opened so that the vacuum in the intake manifold is automatically broken and the ignition circuit is automatically opened when desired.

This device may be utilized for preventing the driver of a vehicle from exceeding a predetermined speed limit. When the device is to be used for this purpose the valves 7 and 17 are disconnected from their operating mechanisms and are left open at all times, and the governor of the engine is adjusted so that the valve 12 will not open until the maximum speed limit is reached. When this speed is reached the valve 12 will open, thus permitting air to enter the inlet manifold and break the vacuum, with the result that fuel will cease entering the engine. A mercury switch or other type of switch may be connected to the valve 12 and located in the ignition circuit so that it will open and break the ignition circuit when the valve 12 is opened at high speeds.

Instead of using a governor or instrument on the engine for opening the valve 12, the extending end of the shaft 13 of this valve may have an arm 13' attached thereto carrying a plate or wide surface 13", as shown in Figs. 6 and 7 against which air from the fan of the engine or an air current caused by the speed of the vehicle strikes for the purpose of opening this valve when the engine reachs a predetermind speed.

In the modification shown in Fig. 5 the three valves 7, 12, and 17 are connected in series in an inlet 5 without a branch outlet. With this arrangement air is prevented from entering the inlet manifold and breaking the vacuum as soon as the brake is applied, since application of the brake closes the valve 7. The result is that the engine aids in braking the car so long as the clutch is in engaging position.

In this Fig. 5 provision is also shown for breaking the ignition circuit when the engine is at sufficiently high speed to open the valve 12 and the fuel supply is shut off, thus opening the valve 17. The ignition circuit may be opened by switches in this circuit which are controlled by the valves 12 and 17 or the mechanism that operates them. For example, in the illustrated embodiment mercury switches 60 and 61 may be carried by the extending ends of the shafts 13 and 18 of the valves 12 and 17, respectively. The line 63 from the ignition switch 64 is divided and the branches pass in parallel through the switches 60 and 61 and thence to an insulated binding post 65 from which the wire 66 leads to the spark coil. The ignition circuit is closed when either one or both of the valves 12, 17 are closed and it is open when both of these valves are open, thus eliminating danger of back-fire of the engine.

Mercury or other sorts of electric switches may be connected in any convenient way to any of the valves shown in each of the embodiments of this invention so as to be opened and closed at the desired times by operation of these valves.

I claim:

1. In an automobile, an internal combustion engine, an air inlet for the intake manifold of said engine having two branches, and two separately operated means to keep said branches closed while said engine is running under power and to open one of said branches by shutting off the power from said engine.

2. In an internal combustion engine, an air inlet for the intake manifold having two branches, means to open one of said branches and said inlet when fuel is cut off at high speed of said engine.

3. In an internal combustion engine, an air inlet for the intake manifold, having two inlet ways open to the atmosphere and means to open one of said inlet ways by applying a brake and the other of said inlet ways by manipulating a fuel feeding means.

4. In an internal combustion engine, an air inlet for the intake manifold of said engine sufficient to break the vacuum in said manifold when said inlet is open, said inlet having two inlet ways freely open to the atmosphere, and a valve located in each one of said inlet ways.

5. In an automobile an internal combustion engine, a two-way air inlet for the intake manifold of said engine, and three valves in said inlet, one of which is opened when said engine reaches a certain speed, another is open until fuel is fed to said engine and the third is opened when a brake is applied for slowing down said automobile.

6. In an internal combustion engine, a two-way air inlet for the intake manifold, and three valves in said inlet, and means connected to said valves for opening the ignition circuit of said engine.

7. In an automobile an internal combustion engine, a brake pedal, a two-way air inlet for the intake manifold, three valves in said inlet, and means connected to one of said valves for opening the ignition circuit of said engine when said brake pedal is applied.

8. In an internal combustion engine, an inlet for the intake manifold, a valve and means associated with said valve for opening the ignition circuit of said engine when said engine reaches a predetermined maximum speed and the throttle is closed.

9. In combination, an internal combustion engine, a brake, an inlet for the intake manifold of said engine, with three valves in said inlet, one of which is opened when said engine reaches a predetermined speed, another is open until fuel is fed to said engine, and the third is opened when the brake is applied to slow down said engine.

10. In a vehicle having a brake and an internal combustion engine, an inlet for the intake manifold of said engine, and means to close said inlet by the application of said brake when said engine is operating under power above a predetermined speed, and means to close said inlet by opening the throttle of said engine.

11. In an internal combustion engine, an air inlet for the intake manifold of said engine, and means operated by high speed of said engine and retarded position of the throttle valve of said engine for opening said inlet.

12. In an internal combustion engine, an air inlet for the intake manifold of said engine, and means, operated when said engine is running at a speed above a predetermined minimum and the throttle valve of said engine is closed below a predetermined minimum closing position, for opening said inlet.

MAX DACH.